US006429375B1

(12) United States Patent
Beckhausen et al.

(10) Patent No.: US 6,429,375 B1
(45) Date of Patent: Aug. 6, 2002

(54) SAFETY CONTACT RAIL OR SAFETY CONTACT ELEMENT

(76) Inventors: Karlheinz Beckhausen, Landgrafenstrasse 109, D-50931 Cologne; Jurgen Menz, Heldehofweg 25, 50858 Cologne, both of (DE)

( * ) Notice: Subject to any disclaimer, the term of this patent is extended or adjusted under 35 U.S.C. 154(b) by 0 days.

(21) Appl. No.: 09/549,139

(22) Filed: Apr. 11, 2000

(51) Int. Cl.[7] .................................................. H02G 3/00

(52) U.S. Cl. ............................ 174/95; 174/43; 174/44; 174/96; 174/97; 200/61.42

(58) Field of Search ............................ 174/95, 43, 44, 174/40 R, 70 A, 70 R, 96, 97, 98, 99 R; 200/61.42, 61.43, 511, 264

(56) References Cited

U.S. PATENT DOCUMENTS 5,023,418 A * 6/1991 Beckhausen ................ 200/511
5,072,080 A * 12/1991 Beckhausen ............. 200/61.43

* cited by examiner

*Primary Examiner*—Chau N. Nguyen
*Assistant Examiner*—W. David Walkenhorst
(74) *Attorney, Agent, or Firm*—Charles L. Schwab; Nexsen Pruet Jacobs & Pollard, LLC

(57) ABSTRACT

A safety contact or switch hose having a plurality of electrically conductive projections which generate a switching pulse when coming into contact with one another.

10 Claims, 8 Drawing Sheets

SAFETY CONTACT RAIL OR SAFETY CONTACT ELEMENT

This invention relates to a safety contact rail for power-driven devices and the like or a safety contact element, as a switch hose and the like, with an elastic hollow section within which there are a plurality of strip-like electrically conductive projections that are isolated from one another by nonconductive cross sections, the conductive projections generating a switching pulse upon coming into contact with one another.

DE 39 21 533 A1 describes a safety contact rail of the stated kind for power-driven devices in which there are two strip-like electrically conductive projections and an also electrically conductive mating surface in the interior of a hollow section. Reliable contact is said to be provided through this practice. Further, there is said to be a post-deformation travel after pulse initiation as a result of this triangular arrangement.

It is an object of the present invention to-improve the safety contact rail of the stated type or a safety contact element in such a fashion that there is always a redundant contact, regardless of the direction in which the initiating force acts on the safety contact rail or safety contact element. The object of the invention is achieved by virtue of the fact that there are at least four strip-like electrically conductive projections and that these projections are identical in form and arranged evenly distributed within the hollow section. The cross-sectional surfaces of the projections are preferably selected and arranged such that they run in pointwise symmetric fashion relative to the central axis of the hollow section. It makes no difference from what direction the force is applied to the safety contact rail or safety contact element, because at least two projections are always in contact with one another and generate switching pulses relative to one another.

The cross-sectional surfaces of the projections are shaped such that they can be essentially defined by two right triangles with unequally long legs. They do not, of course, constitute two triangles, but they can be divided into corresponding triangles and described in this way. The large triangles have their hypotenuses adjoining the inner periphery of the hollow section or form in themselves part of the periphery of the hollow sections, the hypotenuses not being designed as straight lines but being curved in correspondence with the inner periphery of the hollow section or with the outer periphery of the hollow section. Adjacent to the large triangles are small triangles having their long legs adjacent to the long legs of the large triangles, so that the short legs of the large triangles and of the small triangles form a straight line. For the further improvement of contact, strip-like lips are attached to the vertices between the hypotenuses and the short legs of the small triangles, which lips run substantially in prolongation of the hypotenuses of the small triangles and overhang the surfaces of the short legs of the small triangles. As a result of this design of the cross-sectional surfaces of the projections, a cavity is created in the interior of the hollow section along the safety contact rail or safety contact element, which cavity is defined by a square cross-sectional area in the center, on whose lateral surfaces hollow lanes are formed adjacent to each edge, which hollow lanes are constricted by the strip-like lips, further hollow lanes being adjacent to these hollow lanes and angularly offset therefrom and reaching to the nonconductive cross section of the hollow section. The choice of a small contact area, in particular via the strip-like lips, was deliberate. It leads to a high contact pressure, which contributes to self-cleaning of the contact surfaces.

In order to improve the conductivity in the cross-sectional areas of the projections, electrically conductive wires or stranded conductors made of metal, carbon fibers or graphite fibers can be embedded.

The safety contact rail or safety contact element can have two unlike nonconductive regions. First, the strip-like projections can be arranged inside a shell with annular cross section, the shell being fabricated from nonconductive material. Second, the cross sections of the strip-like projections themselves can be part of the outer periphery of the hollow section, nonconductive portions being provided between them. In one case, the outer periphery of the hollow section is completely nonconductive because it is surrounded by the nonconductive shell, while in the other case there are conductive and nonconductive portion-wise regions that form the outer periphery of the hollow section. In the first case cited, with shell, the section is also insensitive to external effects such as moisture and the like, because no "foreign contact" can occur.

The safety contact rail or safety contact element is advantageously fabricated with the elastic hollow section made of extrudible material, in particular rubber or polymers, and fabricated in one piece, including the embedded wires or stranded conductors if applicable, preferably as an endless section in an extruder, so that a homogeneous section is produced. Hollow sections with six or eight, or even more, projections can also be fabricated and used.

By virtue of the fact that in every case there are four conductive cross sections along a safety contact rail or safety contact element, various connections or circuits can be created. If the safety contact rail or safety contact element has one end connected to a transmission line, adjacent electrically conductive cross sections at the opposite end can be connected to one another in parallel or diagonal fashion by flexible contact bridges, a two-wire or four-wire configuration being selectable at the connection end. If a two-wire configuration is chosen, the two free cross sections at the connection end are preferably bridged by a resistor or a diode.

The conductive cross sections, however, can also be flexibly connected to one another with four resistors or diodes at the end of the safety contact rail or safety contact element opposite the connection. The connection end is then connected to a four-channel evaluator, that is, to a four-pole connecting line.

For the further explanation of the invention, reference is made to the Drawing, in which exemplary embodiments of the invention are illustrated in simplified form.

BRIEF DESCRIPTION OF THE DRAWINGS

In FIGS. 1 to 6, insofar as shown in detail, reference numeral 1 denotes a safety contact rail and 2 a safety contact element, which are designed identically except for mounting foot 3 of safety contact rail 1.

Figure 1:
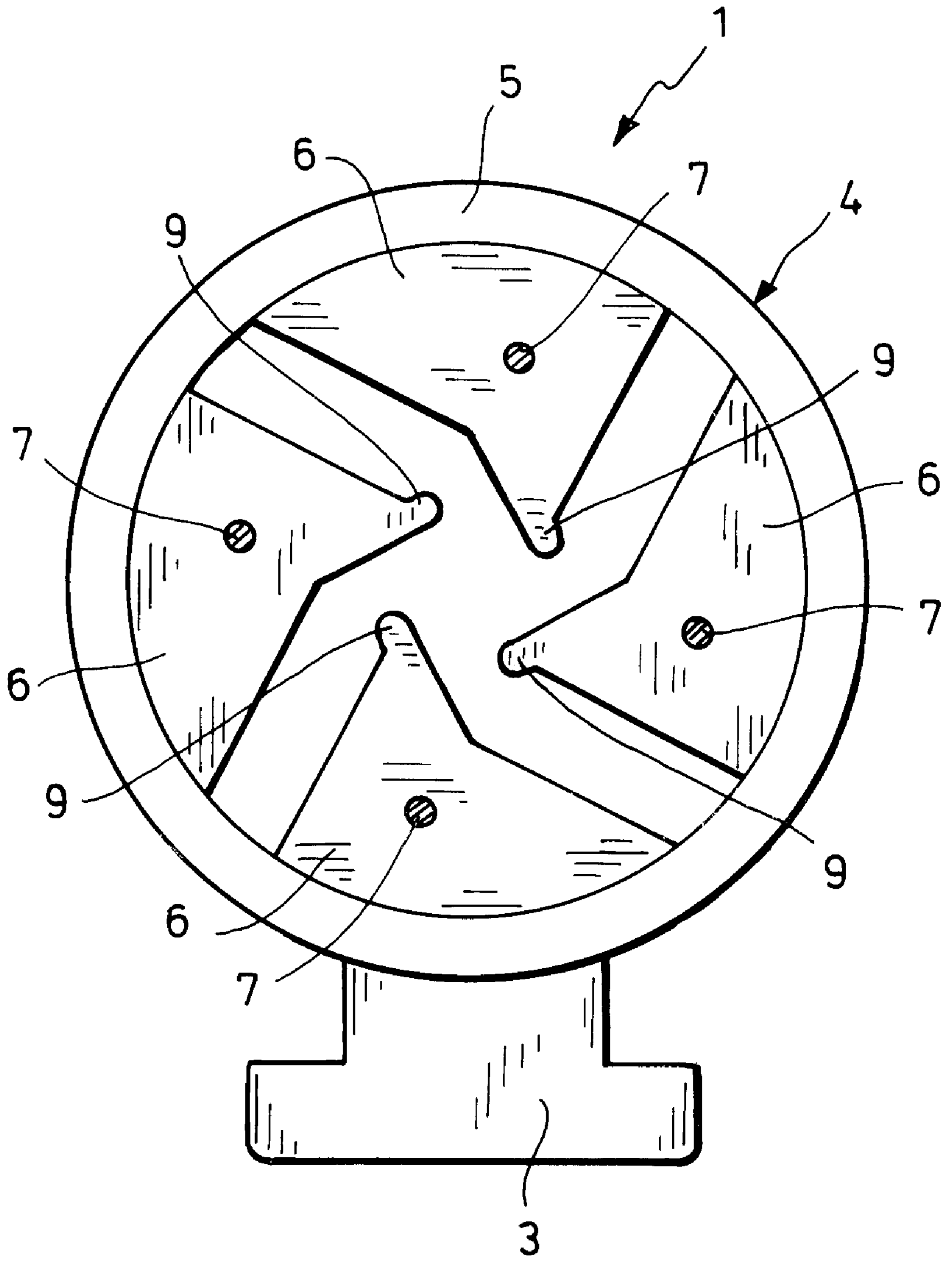
FIG. 1 shows a cross section through a safety contact rail.

Both safety contact rail 1 and safety contact element 2 exhibit a substantially round, elastic hollow section 4, which exhibits, according to FIGS. 1, 2, and 6 to 9, a shell 5 fabricated from nonconductive material. Arranged inside shell 5 are electrically conductive projections 6, whose shape was explained in detail in the general description. Embedded along projections 6 are preferably unisolated copper stranded conductors 7, which improve the electrical conductivity of the projections along the safety contact rail or safety contact element. Strip-like lips 9 are molded on the inner end of projections 6.

Figure 2:
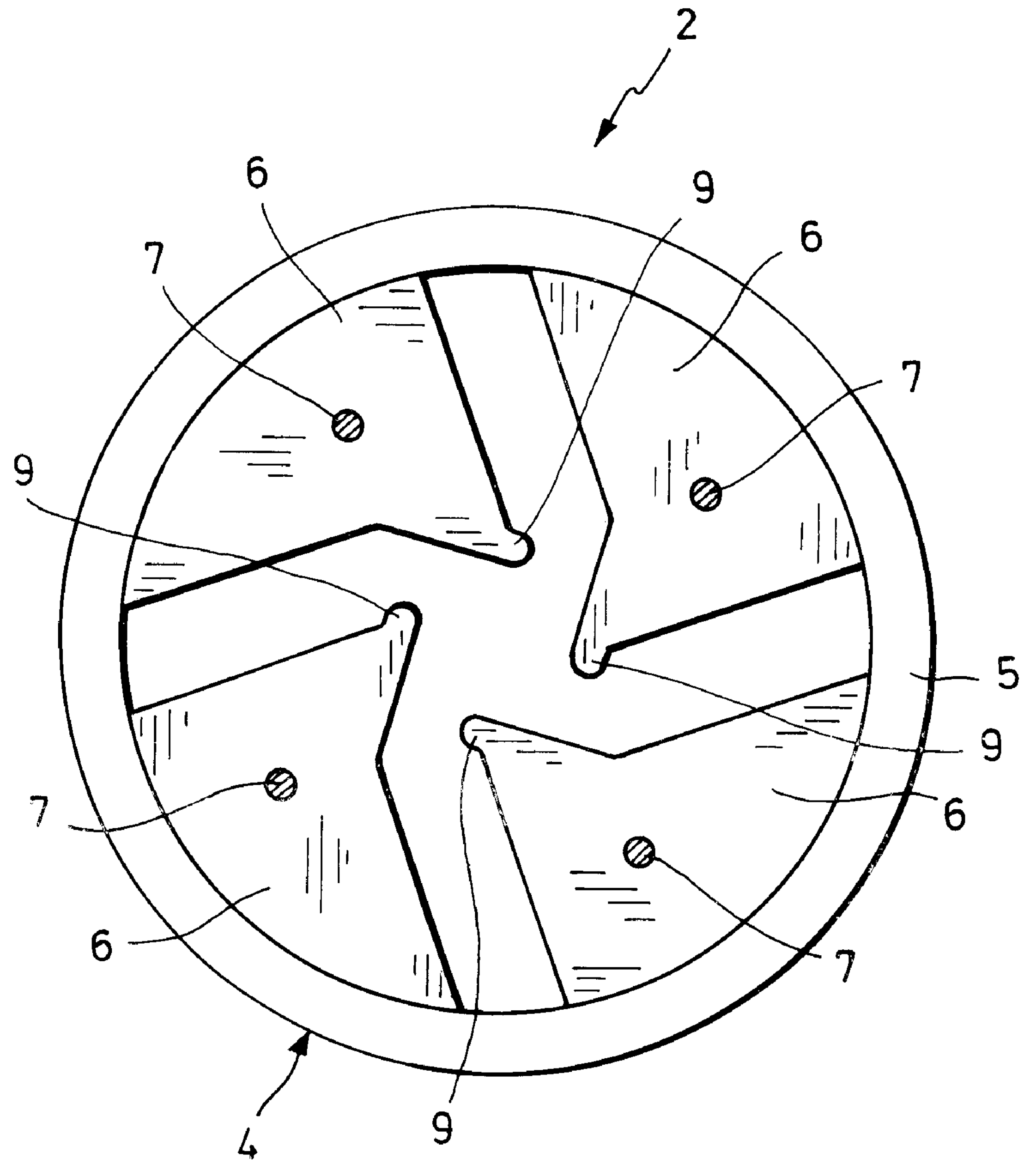
FIG. 2 shows a cross section through a safety contact element.
Figure 3:
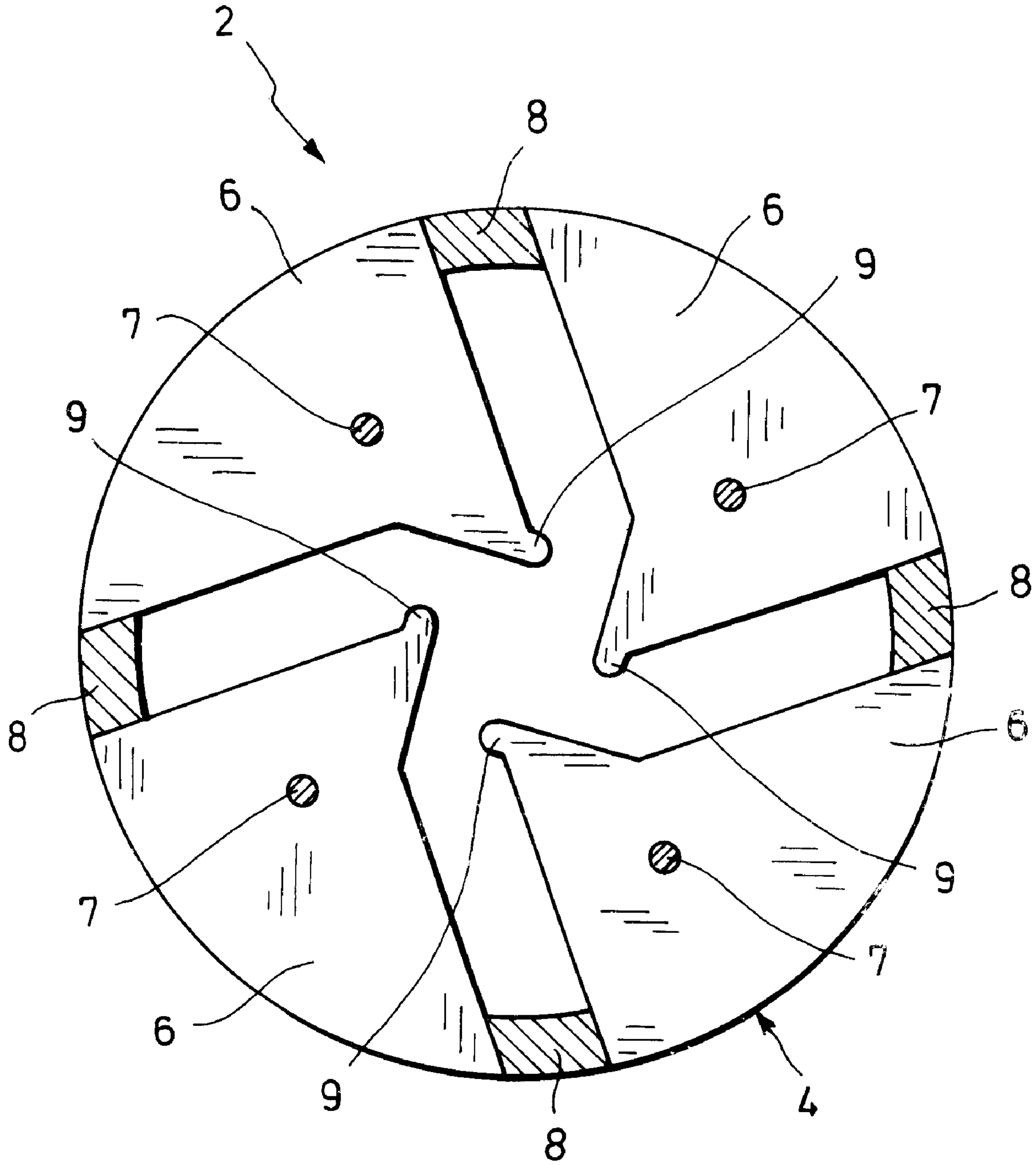
FIG. 3 shows a cross section through a modified safety contact element.

The safety contact element 2 in FIG. 3 differs from FIG. 2 essentially in that there is no shell 5 and that, instead, electrically nonconductive portions 8 are arranged between electrically conductive projections 6. Both the safety contact rail and the safety contact element, including the copper stranded conductors, are extruded in one piece.

Figure 4:
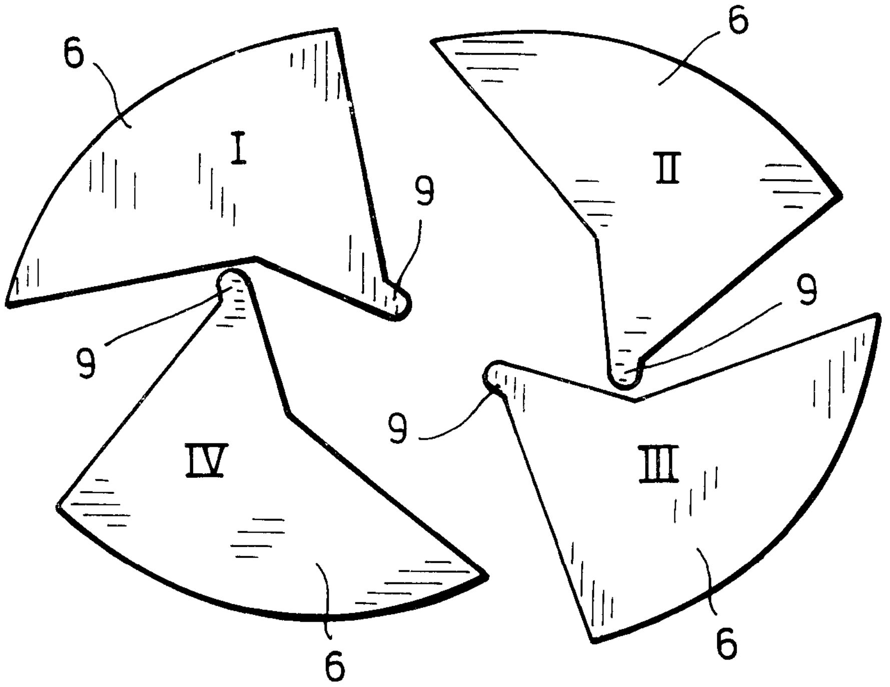
FIGS. 4 and 5 show cross sections in which the strip-like projections are deformed and come in contact with one another.
Figure 5:
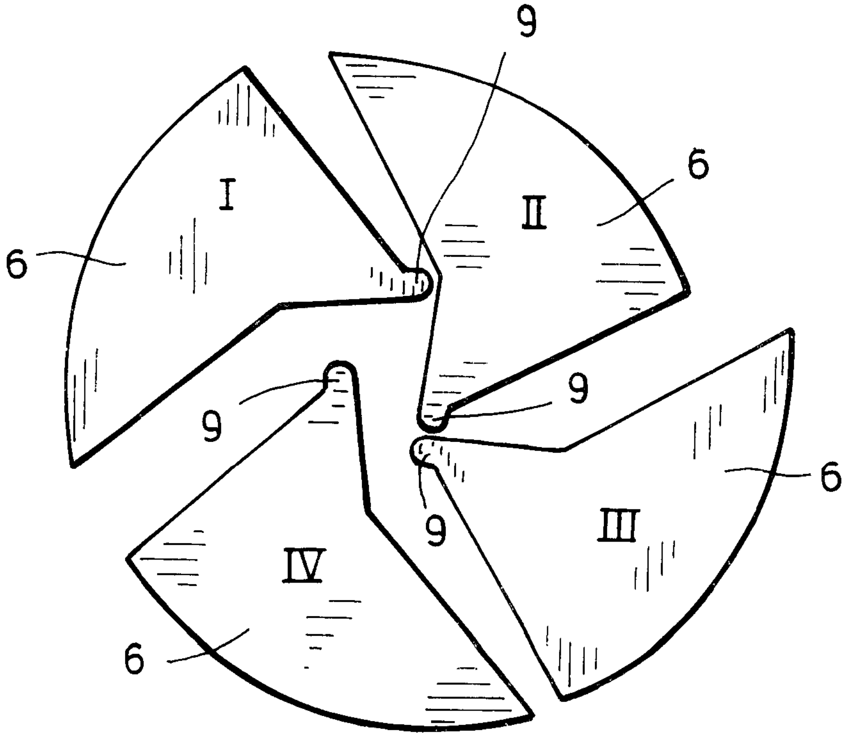
Figure 6:
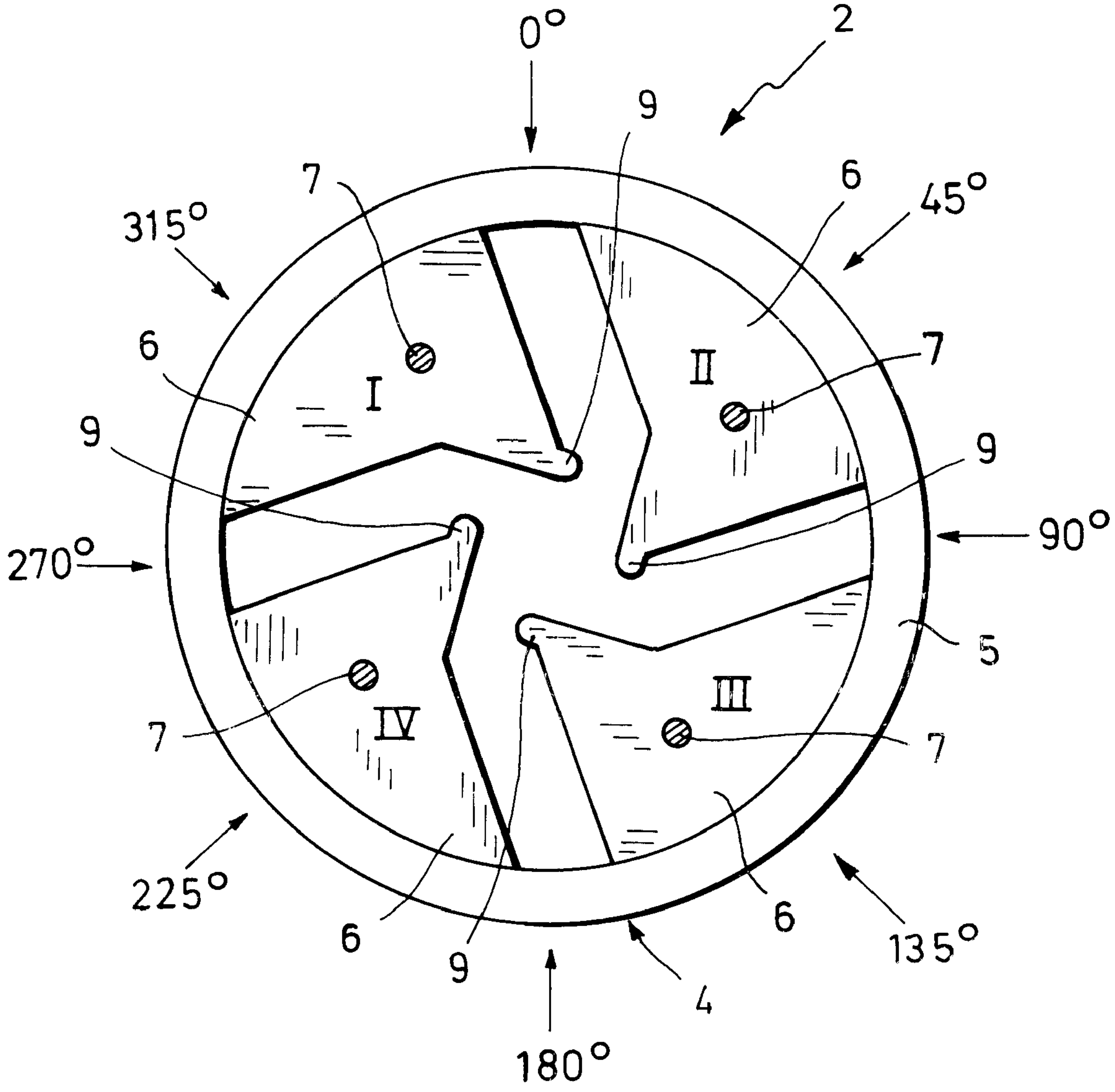
FIG. 6 shows a cross section through a safety contact element according to FIG. 2, to which arrows with degree divisions have been added in order to elucidate the contact possibilities in terms of the direction of the external force.

As can be inferred in particular from FIGS. 4 and 5, at least two conductive projections 6 come into contact with one another—in particular via strip-like lips 9—and generate contact pulses when the safety contact rail or safety contact element is deformed.

Figure 7:
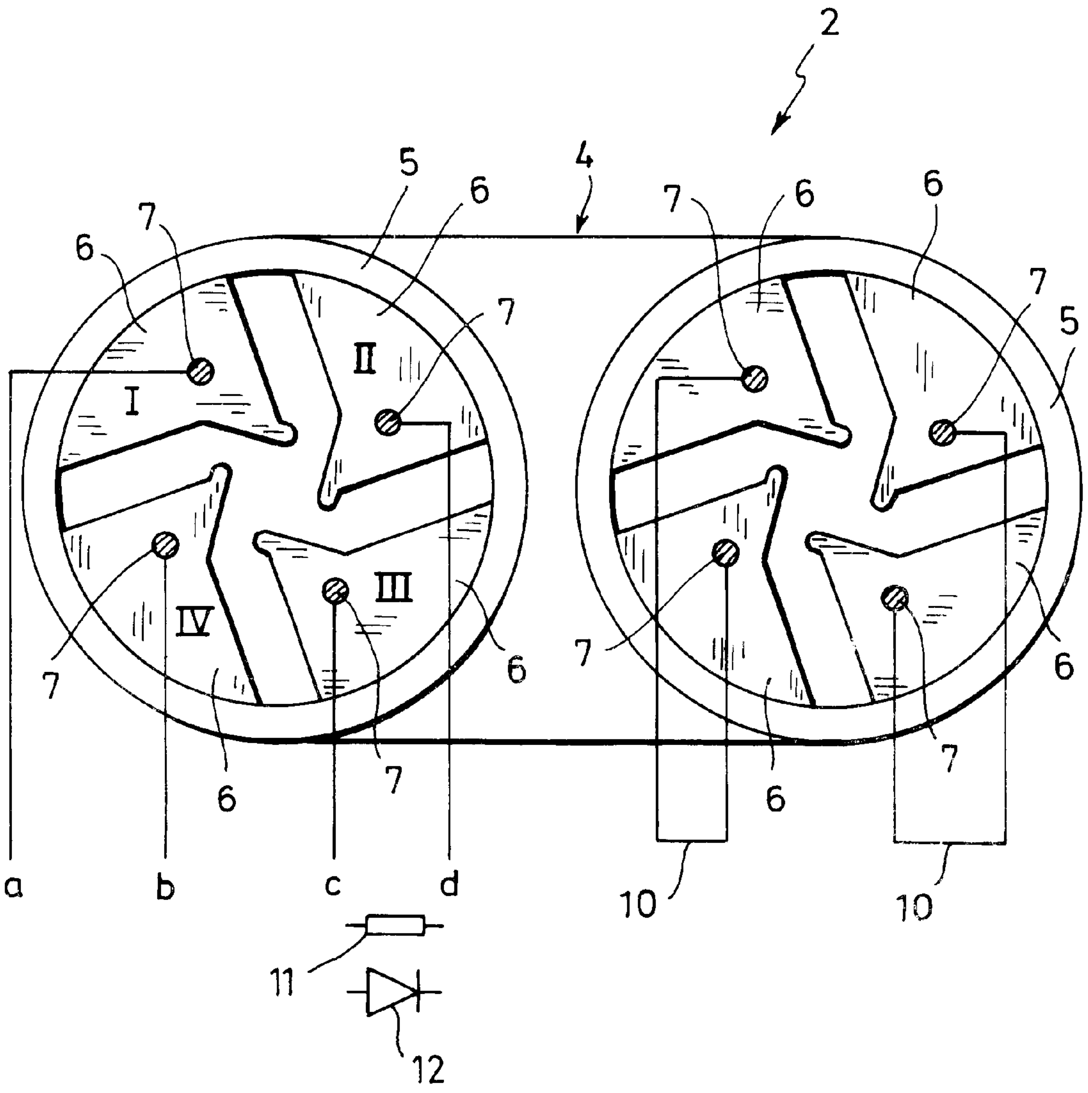
FIG. 7 shows a circuit diagram of a safety contact rail or safety contact element in which, at the end opposite the connection, adjacent electrically conductive projections are connected to one another in pairs via a contact bridge.
Figure 8:
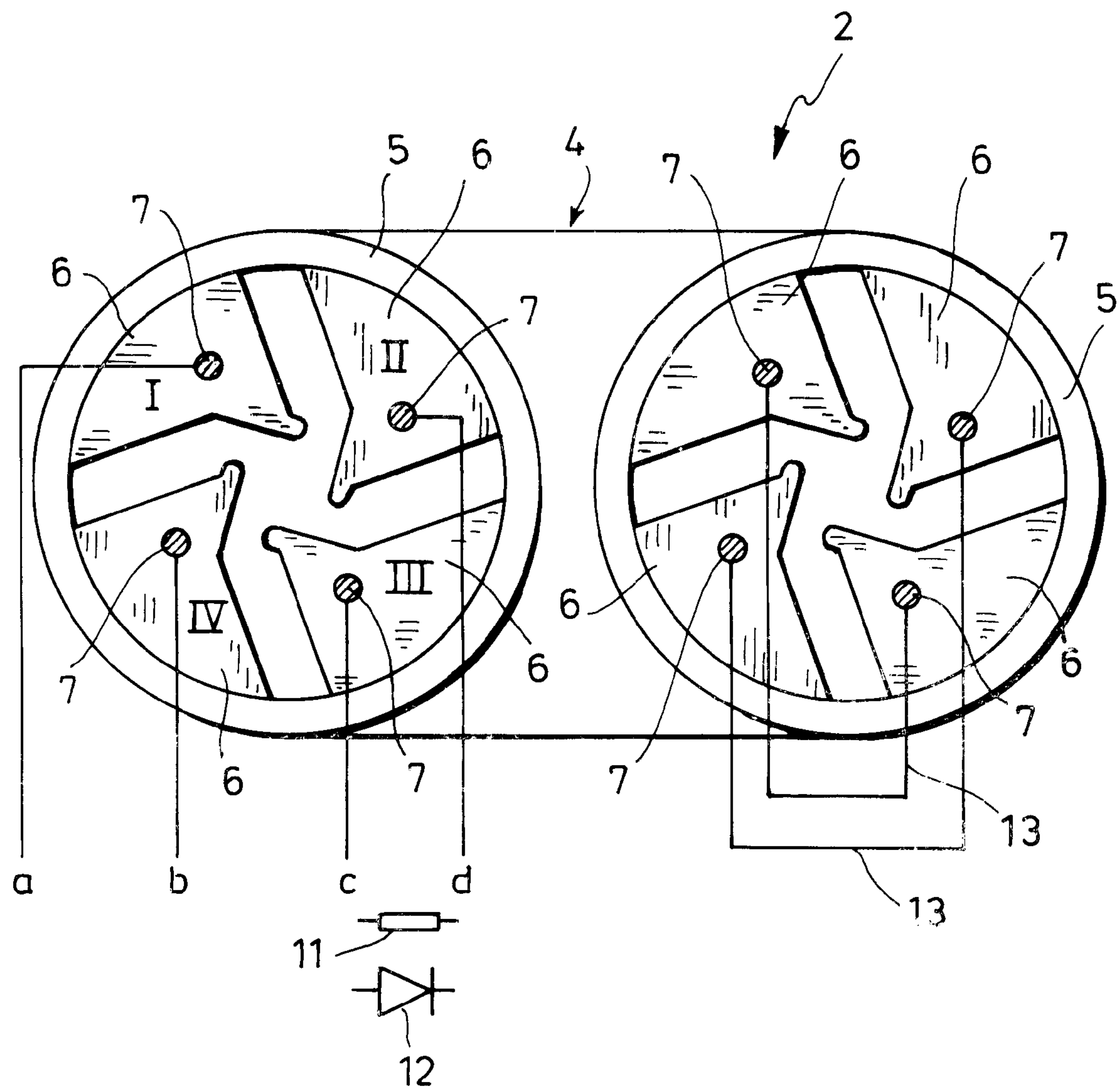
FIG. 8 shows a circuit diagram as in FIG. 7 in which, at the end opposite the connection, the conductive projections are electrically connected to one another in diagonal fashion by a contact bridge.
Figure 9:
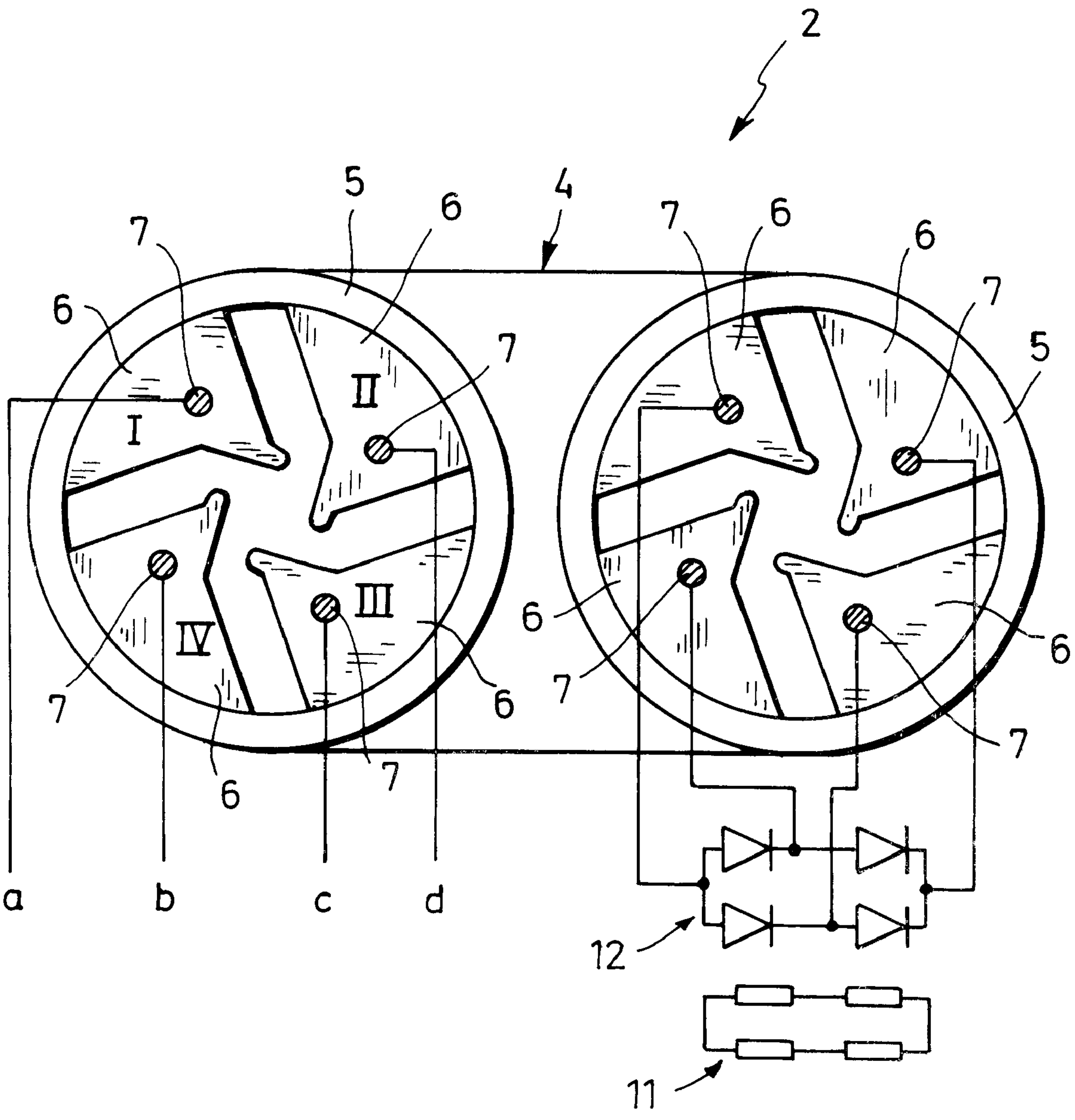
FIG. 9 shows a circuit diagram as in FIGS. 7 and 8 in which, at the end opposite the connection, the electrically conductive projections are connected to one another in flexible fashion by four resistors or four diodes.

The circuit diagrams of FIGS. 7 to 9 show the two end cross sections of an arbitrarily long safety contact element, the upper and lower connecting lines between the two cross sections representing the safety contact element. The connection end is shown at left, the end of the safety contact element opposite the connection end at right. In FIG. 7, the copper stranded conductors of conductive projections 6 arranged one above another are connected together by parallel bridges 10 at the right side of the figure. At the left side, the connections that are connected there to the copper stranded conductors are identified by a to d. They are all used if a four-type connection with the corresponding configuration is selected. If a two-type connection is selected, connections c and d are then bridged via a resistor 11 or a diode 12.

FIG. 8 differs from FIG. 7 only in that, at the end of the safety contact element opposite the connection, copper stranded conductors 7 of projections 6 are connected together in diagonal fashion via correspondingly diagonal bridges 13. Again, a two-wire or four-wire configuration can be selected at the connection end.

FIG. 9 shows the same safety contact element sketched in FIGS. 7 and 8, but with altered connections. At the end opposite the connection, that is, the right side of the figure, the four copper stranded conductors 7 are connected together via four diodes 12 or four resistors 11. All connections a to d at the left side are connected to a four-channel evaluator.

Table showing presence of contact versus angular application of force for the circuit diagram of FIG. 7:

A and B=presence of contact sectors 1, 2 and 3, 4 connected

| | | Sector | | | |
|---|---|---|---|---|---|
| Angle | | 1 | 2 | 3 | 4 |
| 0 | | A | B | B | A |
| 45 | | A | A, B | B | |
| 90 | None | A | A | B | B |
| 135 | | | A | A, B | B |
| 180 | | A | B | B | A |
| 225 | | A | | B | A, B |
| 270 | None | A | A | B | B |
| 315 | | A, B | A | | B |
| 360 | | A | B | B | A |

Table showing presence of contact versus angular application of force for the circuit diagram of FIG. 9:

A and B=presence of contact

| | Sector | | | |
|---|---|---|---|---|
| Angle | 1 | 2 | 3 | 4 |
| 0 | A | B | B | A |
| 45 | A | A, B | B | |
| 90 | A | A | B | B |
| 135 | | A | A, B | B |
| 180 | A | B | B | A |
| 225 | A | | B | A, B |
| 270 | A | A | B | B |
| 315 | A, B | A | | B |
| 360 | A | B | B | A |

What is claimed is:

1. A safety contact rail (1) for power-driven devices or a safety contact element (2), as a switch hose with an elastic hollow section (4) within which there are a plurality of strip-like electrically conductive projections (6) that are isolated from one another by nonconductive cross sections, said conductive projections (6) generating a switching pulse upon coming into contact with one another, characterized in that there are at least four of said strip-like electrically conductive projections (6) which are identical in form and arranged evenly distributed within said hollow section (4), the cross-section surfaces of each of said projections (6) are essentially definable by a small triangle and a large right triangle, each having legs of unequal length, each said large triangle having its hypotenuse connected to the inner periphery of said hollow section (4) or forming the outer periphery of said hollow section (4), the hypotenuses being correspondingly curved, and each of said small triangles having its long leg adjacent to one of said large triangles in such a fashion that the short leg of said large triangle and the short leg of said small triangle form straight lines.

2. The safety contact rail or safety contact element according to claim 1, wherein at the vertices between the hypotenuses and the short legs of the small triangles, there are strip-like lips (9), which run substantially in prolongation of the hypotenuses of the small triangles and overhang the surfaces of the short legs of the small triangles.

3. The safety contact rail or safety contact element according to claim 1, and further comprising at least one electrically conductive wire (7) embedded inside each of said strip-like projections (6).

4. The safety contact rail or safety contact element according to claim 3 wherein said safety contact rail (1) and said safety contact element (2) with the elastic hollow section (4) are extruded in on piece from extrudible material, with said embedded wires in place.

5. The safety contact rail or safety contact element according to claim 1, wherein said strip-like projections (6) are arranged inside a shell (5) with an annular cross section, said shell (5) being fabricated from conductive material.

6. The safety contact rail or safety contact element according to claim 1, wherein said curved hypotenuses of said large triangles form regions of the outer periphery of said hollow section (4) and further comprising nonconductive portions (8) between said strip-like projections (6).

7. The safety contact rail or safety contact element according to claim 1 wherein first and second of said four projections (6) at one end of said rail (1) or element (2) are connected to a power source and the third and fourth of said four projections (6) at said one end of said rail (1) or element (2) are bridged by a resistor (11) or diode (12) and wherein two of said four projections (6) at the other end of said rail (1) or element (2) are electrically interconnected and the other two of said four projections (6) at the other end of said rail (1) or element (2) are electrically interconnected.

8. The safety contact rail (1) or safety contact element (2) according to claim 7 wherein said projections (6) at said other end of said rail (1) or element (2) are interconnected by resistors (11) or diodes (12).

9. The safety contact rail (1) or safety contact element (2) according to claim 8 and further comprising a four channel evaluator connected to said one end of said rail (1) or element (2).

10. A safety contact rail (1) for power-driven devices or a safety contact element (2), as a switch hose with an elastic section (4), comprising:

at least four strip-like electrically conductive projections (6) evenly distributed about the interior periphery of said hollow section (4), the cross-section of each of said projections (6) being defined by a first curved side connected to said interior of said hollow section (4), and second and third sides extending from opposite ends, respectively from said first curved side is an inward direction from said interior periphery of said hollow section (4), said second side being substantially straight and shorter than said third side, said third side being recessed to define a depression in said projection (6), said first side being longer than said third side, and the inward ends of first and second sides junctioning to form a contact lip (9).

* * * * *